United States Patent [19]
Conley et al.

[11] 3,741,706
[45] June 26, 1973

[54] TOY MOLDING DEVICE

[75] Inventors: Dwain Dennis Conley; Jack Lewis Lemkin, both of Cincinnati, Ohio

[73] Assignee: General Mills Fun Group, Inc., Minneapolis, Minn.

[22] Filed: Jan. 26, 1972

[21] Appl. No.: 220,826

[52] U.S. Cl................ 425/406, 425/408, 425/409, 425/450, 100/288
[51] Int. Cl............................................. B29c 3/00
[58] Field of Search................... 425/352, 406, 408, 425/409, 450, 451; 100/288

[56] References Cited
UNITED STATES PATENTS
| | | |
|---|---|---|
| 216,305 | 6/1879 | Brown............................... 425/408 |
| 748,049 | 12/1903 | Cottom.............................. 425/450 |
| 1,347,356 | 7/1920 | Tonkin............................ 425/409 X |
| 1,461,639 | 7/1923 | Wilson et al.................. 100/288 X |
| 2,420,678 | 5/1947 | Pipkin............................. 100/288 X |
| 2,670,481 | 3/1954 | Gulbrandsen.................. 100/288 X |

*Primary Examiner*—Robert L. Spicer, Jr.
*Attorney*—Anthony A. Juettner and L. McRoy Lillehaugen

[57] ABSTRACT

A molding device for forming a shaped object from a soft moldable material. The device includes at least one die having a mold cavity which cooperates with a second die or a forming plate, to form a three-dimensional object. By manipulating a handle assembly which forms a part of the device, the moldable material is forced into the mold cavity(ies), so that such material assumes the shape of the mold cavity.

12 Claims, 9 Drawing Figures

PATENTED JUN 26 1973　　　　　　　　　　　　　　　　　3,741,706

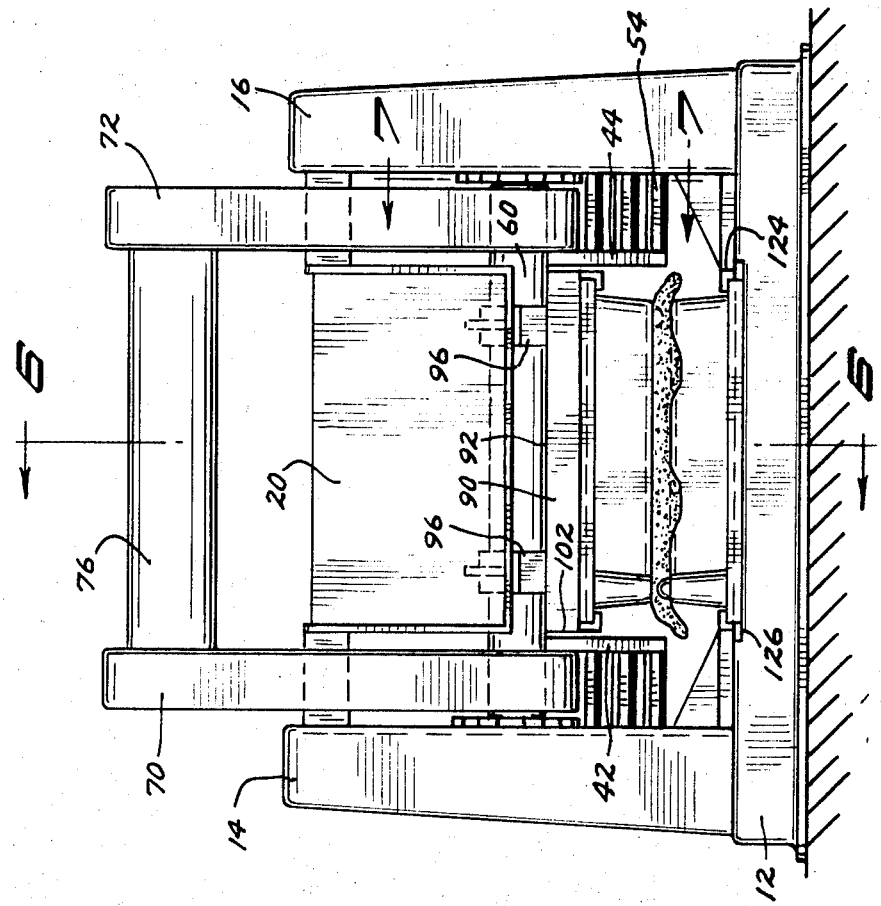
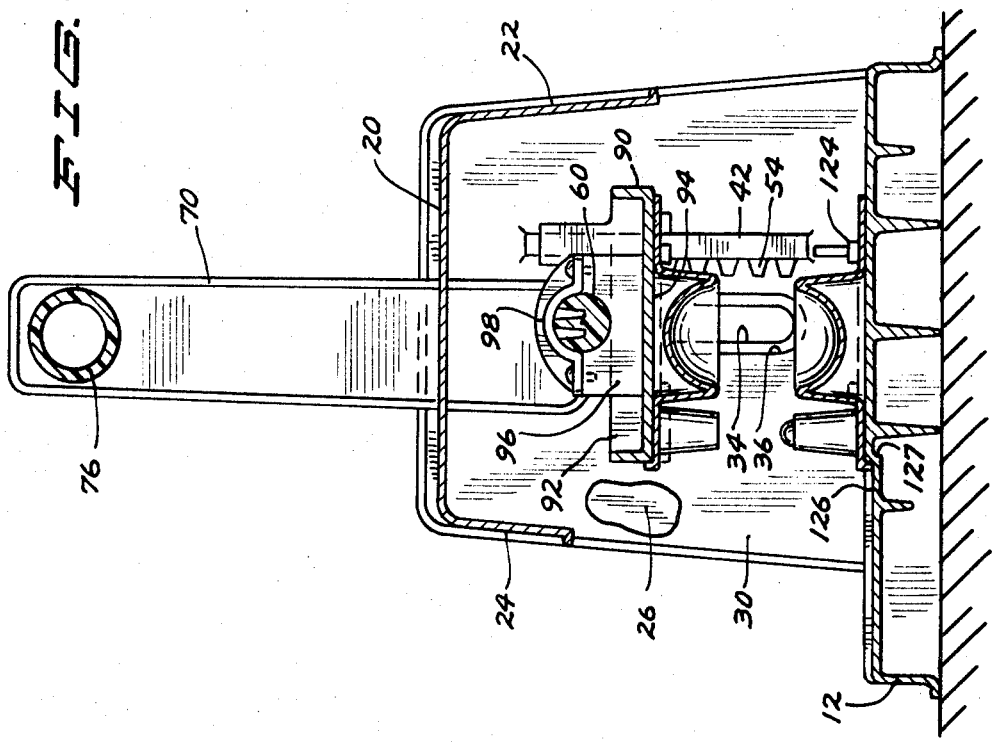

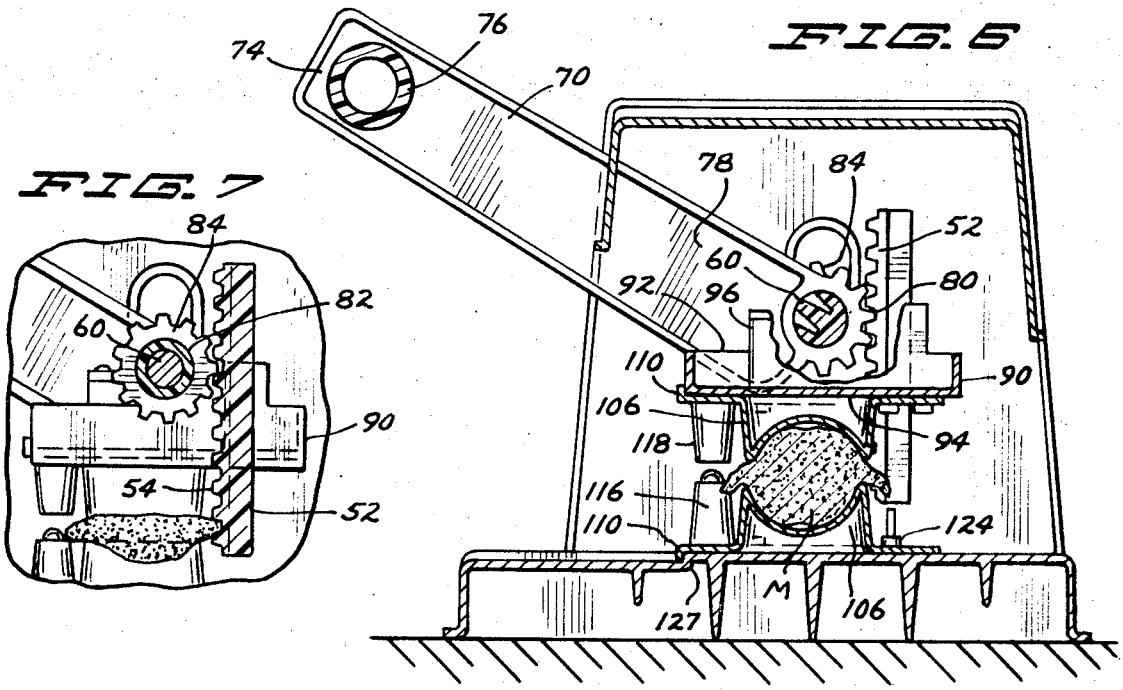
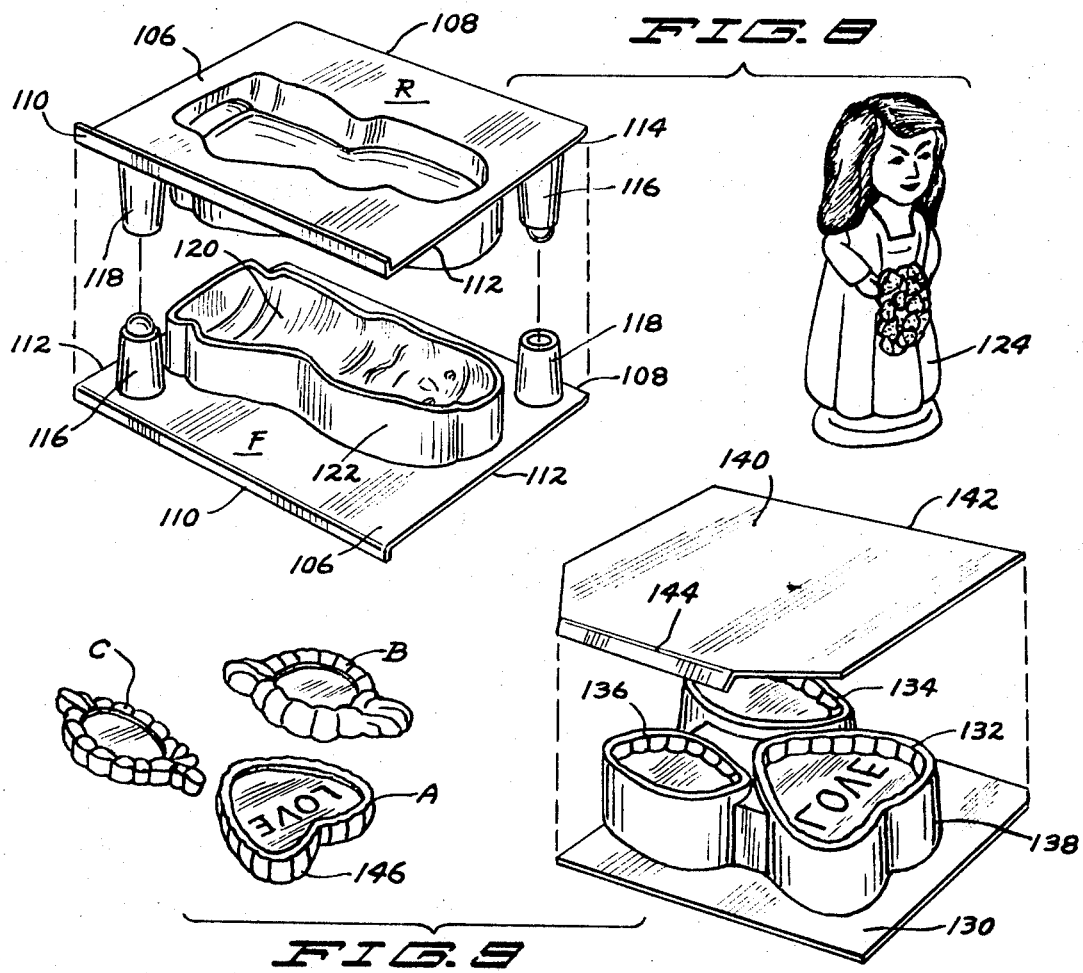

TOY MOLDING DEVICE

The present invention relates to toys, and more particularly to a molding device or press for forming three-dimensional objects from a moldable material.

In the past, a variety of toys have been devised for forming a modeling compound, such as clay or other similar material, into a desired configuration. Extrusion devices having a chamber with a movable piston or plunger therein and a die opening having a prescribed size and shape, have been used for expelling the modeling compound into an extrudate having a desired cross-sectional size and shape. In another related toy, a quantity of the modeling compound is placed between a pair of die members which are then forced or pressed together so that the excess material exudes between the die members; and a molded figure having substantially the same size and shape as the die members, is formed. Numerous and constant efforts are continuously being made to devise toys which are improvements over, and different from, items commercially available for handling modeling compounds.

Accordingly, one object of the present invention is to provide a new and improved molding device for handling a modeling compound.

Another object is to provide a molding device which can be used to form three-dimensional objects having a variety of sizes and configurations, from a modeling compound.

A further object is to provide a toy molding press having improved means for positioning and moving a pair of cooperating die members relative to each other, so that molded objects having a prescribed size and shape can be readily formed.

A still further object is to provide a molding toy which is relatively simple and durable in construction, easy to operate, rugged in construction, and relatively inexpensive to manufacture.

Other objects and advantages of the invention will become apparent from a consideration of the following specification and accompanying drawings. Before proceeding with a detailed description of the invention however, a brief resume of it will be presented.

In general, the invention includes a base member having a pair of spaced-apart upright support members secured to it, thus forming a support structure. The upright members are provided with means for mounting a handle assembly in such a manner that the handle can be vertically moved along the upright or vertical axis of the support members, as well as pivotally movable about a transverse axis which is perpendicular to such vertical axis. A toothed rack assembly is secured to each of the vertical uprights, and it cooperates with a rotatable gear secured to the handle for providing the vertical handle movement, as well as with a pawl forming a part of the handle assembly for providing the pivotal handle movement. A platen is secured to the handle for movement along the vertical axis, and both it and the base member are adapted to engage and retain a pair of dies, each formed as having a predefined mold cavity, in a predetermined position. By placing a quantity of the modeling compound between the dies and manipulating the handle, a three-dimensional object can be formed.

The invention will best be understood by reference to the following drawings wherein:

FIG. 4 is a slightly enlarged sectional view taken along line 4—4 of FIG. 1;

FIG. 5 is a slightly enlarged front elevational view similar to FIG. 1, which illustrates the invention in a different operating condition;

FIG. 6 is a slightly enlarged sectional view taken along line 6-6 of FIG. 5;

FIG. 7 is a partial sectional view taken along line 7—7 of FIG. 5;

FIG. 8 is a perspective view which illustrates a pair of dies as well as the three-dimensional object formed by such dies; and FIG. 9 is a perspective view which illustrates a die and a forming plate or platen insert, as well as the objects formed by using them.

Figures 1, 2:
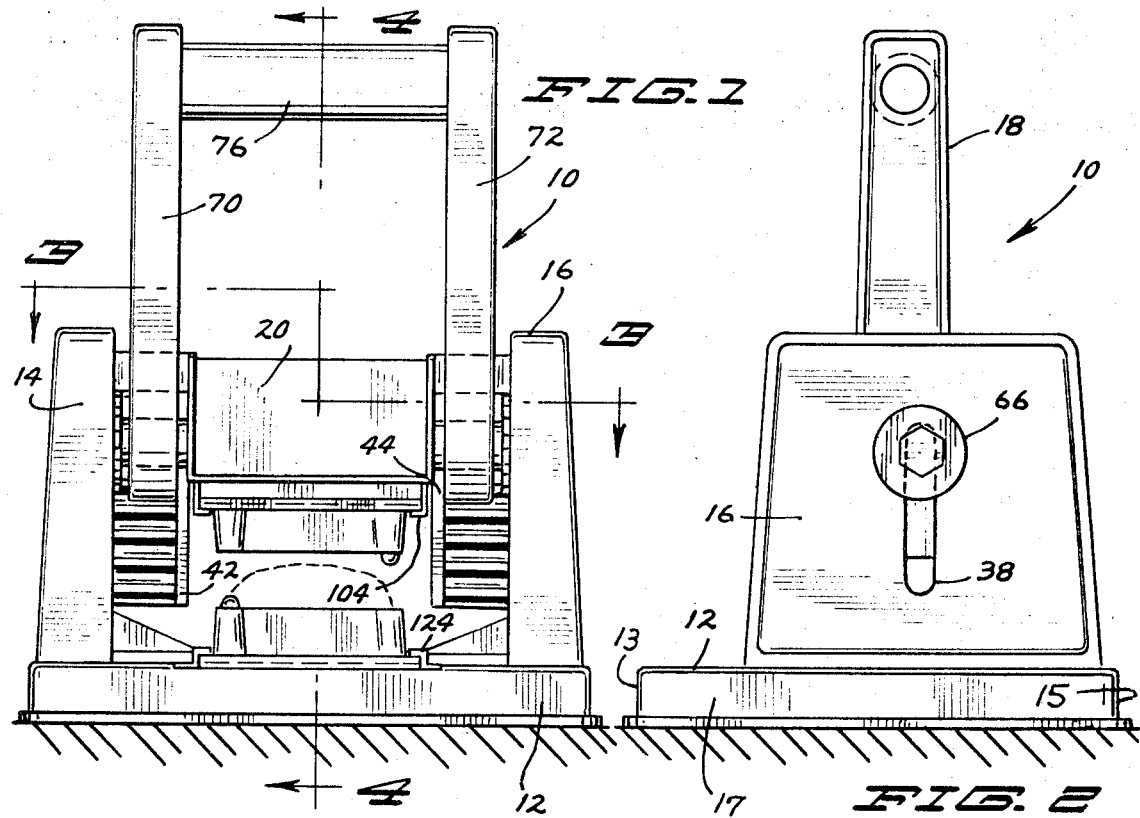
FIG. 1 is a front elevational view of a molding device embodying the invention which illustrates the device in a first operating condition.
FIG. 2 is a side elevational view of the invention.
Figure 3:
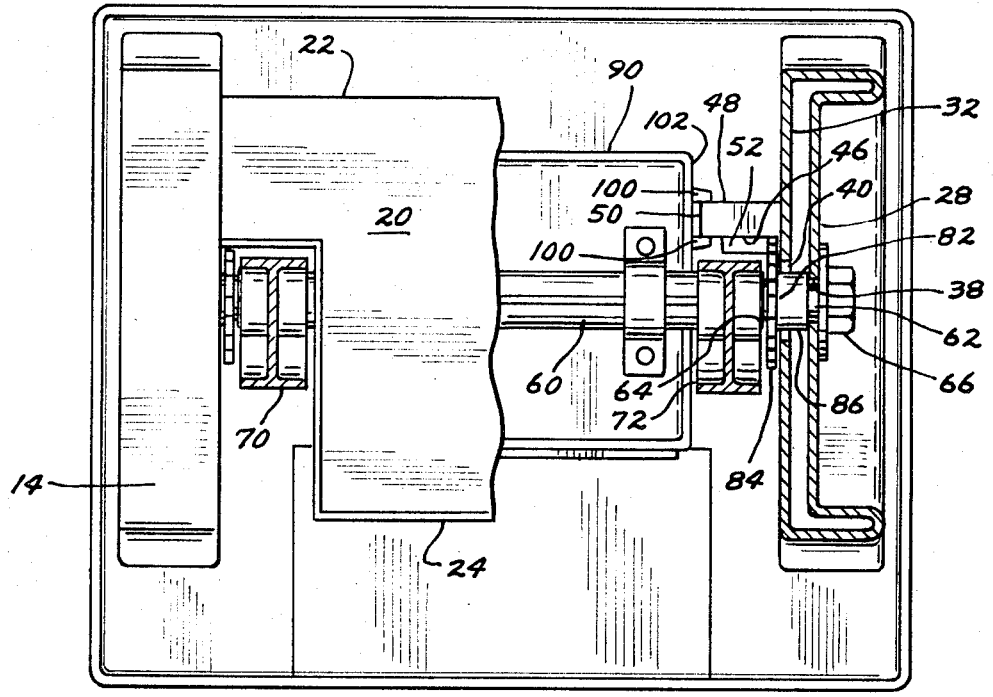
FIG. 3 is a slightly enlarged, partial sectional view taken along line 3—3 of FIG. 1.

FIGS. 1–3 illustrate a toy molding device designated generally by reference numeral 10, as having a generally rectangular base member 12, a pair of spaced-apart upright or vertical support members 14 and 16, secured at one end to the base member, and a handle assembly designated by numeral 18 which is movably supported by the support members 14 and 16. The base member has a front edge 13, a rear edge 15, and a pair of side edges 17. A T-shaped top cover 20 connects the upper portion of the support members together. The cover 20 includes a rear panel 22 and a front panel 24; in this regard, note FIG. 4 as well. At least some of the various components are preferably individually formed, and fastened together, by adhesives for example, to form the assembled device.

As depicted more fully in FIGS. 3 and 4, the upright members 14 and 16 are substantially hollow. The upright member 14 has an outer wall 26 and an inner wall 30, and the member 16 has an outer wall 28 and an inner wall 32. The outer wall 26 is provided with an elongated slot 34, and the inner wall 30 is provided with an elongated slot 36. The outer wall 28 is also provided with an elongated slot 38, and the inner wall 32 is provided with an elongated slot 40. All the slots extend along an upright or vertical axis. As shown, the slots in the inner walls are slightly wider than the slots in the outer walls.

The upright members 14 and 16 are also provided with elongated inwardly facing vertical side standards 42 and 44 respectively which are preferably formed as an integral part of the inner walls 28 and 32. The standards 42 and 44 are generally rectangular in cross-section, and each is provided with a front surface 46, a rear surface 48, and a side surface or edge 50. Racks 52 form a part of the front surface of each standard, and each rack is provided with a plurality of vertically aligned rack teeth 54. As shown, each rack is slightly narrower than its corresponding standard. The edges 50 of each standard thus form inwardly facing surfaces for a purpose to be described hereinafter.

The handle 18 is secured to the support members 14 and 16 by means of a substantially cylindrical shaft 60. The shaft 60 is aligned so that it extends transversely between the support members 14 and 16, and its longitudinal axis is perpendicular to the vertical axis of the support members. As viewed in FIG. 3, the shaft 60 is formed so that its ends 62 have a smaller diameter than the main portion of the shaft, thus forming shoulders 64. The shaft ends 62 project through the slots in the support members 14 and 16 so that the shafts can move along a vertical axis when the handle 18 is in an upright position. As illustrated, the diameter of the end 62 is slightly smaller than the width of the slots 34 and 38. Caps 66 are secured to each of the ends 62.

The handle 18 includes a pair of elongated arms 70 and 72 which are maintained in spaced-apart relationship at their first ends 74 by means of a tubular spacer 76. The opposite ends 78 of the arms are rotatably mounted on the shaft 60 by appropriate means. Each end 78 is provided with a partial spur gear or pawl 80 having a plurality of teeth; in this regard note FIG. 6 which shows the gear teeth as being offset relative to the longitudinal center line of the arm 70. The pawl 80 is positioned relative to the support members 14 and 16 so that the teeth mesh with the teeth on the rack 52.

A pair of spur gears 82 are secured to the shaft 50 so that they also mesh with the racks 52. This helps maintain the longitudinal axis of the shaft 60 parallel to the base 12. Each gear 81 is provided with a plurality of teeth 84 and a hub 86. As depicted in FIG. 3, the gears 82 are mounted on the end portions 62 of the shaft 60 so that the gear teeth 84 are interposed between the shoulders 64 and the inner walls. As shown, the diameter of the hub 86 is slightly smaller than the width of the slot 40, and it projects into the slot so that it terminates proximate the outer wall 18. The gear teeth 84 mesh with the teeth on the rack 52. 122 A movable platen 90 is provided for holding a die, and it is secured to the shaft 60 so that it is positioned between the shaft 60 and the top surface of the base 12. The platen 90 has a generally rectangular top configuration with a top surface 92 and a bottom surface 94. As disclosed in FIG. 4 and 5, a pair of cradles 96 are secured to the top surface 92 of the platen, and a yoke or bearing block 98 is secured to each cradle by appropriate means. A pair of spaced-apart protrusions 100 (see FIG. 3) are secured to the side edges 102 of the platen 90 so that the edges 50 of the standards 42 and 44 are positioned between them. The protrusions 100 and the edges 50 cooperate to guide the platen 90 as it moves along a vertical axis. Moreover, the platen 90 is rotatably secured relative to the shaft 60 as the shaft 60 and the gears 82 move relative to the slots in the support members 14 and 16. Rabbets 104 are formed on the bottom surface 94 of the platen 90 proximate the sides 102, for receiving and supporting a die 106.

As exemplified in FIGS. 8 and 9, the dies 106 have a rectangular shape. Each die is formed as having a front edge 108, a rear edge which is bent to form a narrow flange 110, and side edges 112. The front portion of each side edge is tapered slightly at 114 to facilitate insertion of the die into the rabbets 104. Each die 106 is provided with a male aligning post 116 and a female aligning post 118, which project perpendicularly from the surface of the die. The posts are located at corners of the die which are diagonally opposite each other. The male and female posts mate with each other so as to align a pair of dies relative to each other.

Each die is provided with a mold cavity 120 formed by an irregular wall 122 which projects away from the surface of the die. The mold cavity of two cooperating dies are designed to form front and back surfaces of a three-dimensional object. Thus, as illustrated in FIG. 8, a three-dimensional girl object 124 has been formed by using dies designated F and R. The mold cavity of the F die has a configuration of the front portion of the object 124, while the mold cavity of the R die has the configuration of the rear portion of the object. Numerous other objects can of course be formed by selecting dies having different matching mold cavities.

One of the dies 106 is secured to the platen 90 by sliding it between the rabbets 104, while the other die 106 is secured to the base 12 by sliding it between L-shaped guides 124 secured to the top surface of the base. At least two of such guides are provided on the base for loosely gripping each side edge 112 of one of the dies. A slightly recessed portion or cavity 126 is provided in the front section of the base 12 so as to form a shoulder 127 with the remainder of the top surface of the base.

In some instances it might be preferred to form an object having one flat surface, rather than two configured surfaces. FIG. 9 illustrates the components for forming such an object. A die 130 is shown as having three separate die cavities 132, 134, and 136, formed by upstanding walls 138. The other component os such a system is a flat plate 140 having a front edge 142 and a rear edge which forms a narrow flange 144. The die 130 and the plate 140 can be used to form objects designated A, B and C, having substantially flat bottom surfaces 146, rather than two configurated or sculptured surfaces.

In operation, the user of the toy selects one or more dies having the desired mold cavities and secures one of them to the platen by sliding it between the rabbets 104 until the flange 110 is juxtaposed against the front edge of the platen 90, and the other die is positioned on the base 12 directly below the platen 90 so that it is retained in place by the guides 124. By sliding the die toward the rear of the base 12, the flanged edge 110 becomes juxtaposed against the shoulder 127. For purposes of illustration, assume that dies 106 as shown in FIG. 8 are selected. When properly aligned as stated above, one of the dies is positioned directly on top of the other and the posts 116 and 118 are aligned so as to mate with each other. Since the dies are interchangeable, either one can be placed on the platen 90, and the other one is then positioned on the base 12.

At this point, it should be pointed that that it might be necessary to first manipulate the handle 18 so that sufficient space exists between the platen 90 and the top surface of the base 12 so as to accommodate a pair of dies 106. This is readily accomplished by gripping the handle 18 and pivoting it so that it is vertically oriented, i.e., it projects upwardly. At this point, the gear teeth 80 on the ends of the arms 70 and 72, become disengaged from the teeth 54 on the rack 52, and the handle, and more specifically the shaft 60, are free to move in a vertical direction within the slots in the support members 14 and 16. As the handle 18 moves in this manner, the platen 90 slides relative to the edges 50 of the standards 42 and 44, and the spur gears 84 rotate and mesh with the rack teeth 54.

A small quantity of the modeling compound designated M, is placed on the lower die 106. In some instances it might be advisable to first knead or work with the compound, so that it becomes somewhat flexible and pliable. The specific shape of the mass of compound can vary, depending upon the shape of the object to be formed. In forming the object 124 for example, it is expedient to form the mass into a somewhat cylindrical shape. The mass can be placed on the lower die 106 either before or after the die is placed in the proper position on the base member 12.

With the handle 18 in a vertical position, the platen 90 is lowered until the upper die contacts the mass of modeling compound M. The protrusions 100 cooperate with the edges 50 of the standards 42 and 44, to maintain parallelism between the platen 90 and the base 12 as well as to assure movement along a vertical axis. As the handle is pivoted in a clockwise direction, the pawls 18 engage the rack teeth 54, and considerable pressure can be exerted on the projecting end of the handle 18. Downward pressure on the end of the handle forces the platen 90 and the upper die 106 vertically downward toward the lower die; as this action occurs, the modeling compound M is compressed into the cavities 120 so that it is distributed throughout the cavities.

Excess quantities of the compound exude between the walls 122 of the dies until the edges of the walls contact each other. During this operation, it might be necessary or preferred to re-position the handle 18, and more specifically the pawls 80, relative to the racks 52 one or more times. This is readily accomplished by pivoting the handle 18 in a counterclockwise direction until it is vertically oriented, and then merely moving it along a vertical axis, within the slots in the members 14 and 16. As the upper die is moved toward the lower die, the male and female posts 116 and 118 are aligned with each other until they become engaged.

When the operation has been completed, the excess molding compound is removed from the exterior or the cavities, and the handle 18 is manipulated so that the platen 90 and the upper die are moved upwardly. The molded object 124 is then positioned in the lower die, which is removed from the base member 12. The molded object is then removed from the cavity in the lower die, after which it can be placed in an upright position.

Since different types of modeling compounds can be used with this device, no detailed description of any specific compound will be presented. For example, modeling compounds are commercially available which will harden after they have been exposed to the atmosphere. Such compounds can then be painted if desired, to present a unique and interesting statue or toy.

As explained hereinbefore, objects with one flat surface can also be formed by using a die with a cavity therein, and a flat plate 140. Operation of the present invention with these items is substantially the same as that described above. It has been found that it is preferred to secure the plate 140 to the platen 90, and position the die 130 on the base 12. A quantity of the modeling compound M is preferably formed into a somewhat flattened mass after which it is placed over the cavity(ies) on the die 130. By operating the device as described above, objects as illustrated in FIG. 9 can be formed.

In the above description and attached drawings, a disclosure of the principles of this invention is presented, together with some of the specific embodiments by which the invention might be carried out.

Now, therefore, we claim;

1. A molding device comprising a base member, a pair of spaced apart upright support members secured at one end to said base member, a handle assembly, means for attaching one end of said handle to at least one of said upright members so that it is pivotable about a transverse axis extending between said upright members and movable along a vertical axis normal to said transverse axis, a platen, means for securing said platen to said handle assembly so that it is positioned between said upright members for movement along said vertical axis, at least one die having a mold cavity, means cooperating with said die for forming an object having a prescribed configuration, and means for removably securing said die and said cooperating means to the molding device so that they are interposed between the platen and the base member, and one of them is secured to said platen and the other is secured to said base member.

2. The combination of claim 1 wherein the means for attaching the handle to the upright support member includes a shaft which extends transversely between said support members, means for connection said shaft to said support members for movement along said vertical axis, said handle assembly includes a pair of spaced apart arms, and means are provided for rotatably mounting the end of each handle arm on said shaft.

3. The combination of claim 2 wherein each support member is provided with an inwardly facing vertical side standard, the end portions of said shaft being positioned proximate said standards.

4. The combination of claim 3 wherein each support member is provided with a vertically extending elongated slot, said slots being positioned proximate the side standards, the ends of said shaft extending into said slot and being retained for vertical movement therein.

5. The combination of claim 4 wherein each side standard has a generally rectangular cross-section and a front surface having a rack with a plurality of vertically aligned teeth thereon, said slots being positioned in front of said racks, and the handle assembly includes means for meshing with said rack teeth as said handle is pivoted relative to the support members.

6. The combination of claim 5 wherein the end of each handle arm includes a plurality of teeth adapted to mesh with the teeth on said racks, said handle teeth becoming disengaged from the teeth on said racks when the handle is pivoted so that it projects upwardly, such upward orientation of the handle permitting the shaft to be moved relative to the slots.

7. The combination of claim 6 wherein a spur gear is secured to the shaft proximate each of its ends, each spur gear being interposed between a handle arm and a support member and being adapted to mesh with the teeth on said rack.

8. The combination of claim 3 wherein means are provided for securing the platen to the shaft so that it is interposed between said shaft and the base member, said shaft being rotatable relative to said platen.

9. The combination of claim 8 wherein said platen includes a side edge proximate each of the vertical standards, and a pair of protrusions are secured to each side edge, the protrusions of each pair being positioned so that an edge of the standards is interposed between them.

10. The combination of claim 1 wherein the means cooperating with the die comprises a second die having a mold cavity, said mold cavities adapted to form an object having configured front and rear surfaces, said dies being oriented on said platen and said base member so that said mold cavities face each other.

11. The combination of claim 1 wherein the means cooperating with the die comprises a plate member, said die and said plate cooperating to form an object having one flat surface.

12. A molding device comprising a base member, a pair of spaced apart upright support members secured at one end to said base member, a handle assembly having a pair of spaced apart arms, a shaft transversely interposed between said support members so that its longitudinal axis is normal to the upright supports, means for movably securing said shaft to the support members so that it is rotatable about its longitudinal axis and movable along a vertical axis normal to said longitudinal axis, means for rotatably connecting the handle arms to said shaft, means for limiting vertical movement of the shaft as the arms are pivoted relative to the shaft, a platen, means for attaching said platen to said shaft, and means for maintaining parallelism between said platen and said base member as the shaft and said platen are moved along the vertical axis.

* * * * *